United States Patent [19]

Mackay et al.

[11] Patent Number: 5,688,317
[45] Date of Patent: Nov. 18, 1997

[54] CARBON BLACKS

[75] Inventors: Bruce E. Mackay, Framingham; Mark A. Wilkinson; Barrie J. Yates, both of Lexington, all of Mass.

[73] Assignee: Cabot Corporation, Boston, Mass.

[21] Appl. No.: 375,015

[22] Filed: Jan. 19, 1995

Related U.S. Application Data

[63] Continuation-in-part of Ser. No. 202,244, Feb. 25, 1994, Pat. No. 5,456,750, which is a continuation-in-part of Ser. No. 81,881, Jun. 25, 1993, abandoned, which is a continuation-in-part of Ser. No. 935,794, Aug. 27, 1992, abandoned.

[51] Int. Cl.$^6$ ............................................. C09C 1/48
[52] U.S. Cl. ........................ 106/476; 423/449.1; 524/495
[58] Field of Search .................... 106/476; 524/495; 423/449.1

[56] References Cited

U.S. PATENT DOCUMENTS

| | | | |
|---|---|---|---|
| 3,787,562 | 1/1974 | Heller et al. | 423/449.1 |
| 3,799,788 | 3/1974 | Jordan et al. | 423/449.1 |
| 3,961,902 | 6/1976 | Vanderveen | 23/259.5 |
| 4,221,772 | 9/1980 | Eisenmenger et al. | 423/449.1 |
| 4,366,137 | 12/1982 | Kuhner et al. | 423/449.1 |
| 4,500,672 | 2/1985 | Suzuki et al. | 524/496 |
| 4,601,892 | 7/1986 | Hart et al. | 423/456 |
| 5,190,739 | 3/1993 | Mackay et al. | 423/450 |
| 5,229,452 | 7/1993 | Green et al. | 524/415 |
| 5,456,750 | 10/1995 | Mockoy et al. | 423/449.1 |

FOREIGN PATENT DOCUMENTS

| | | | |
|---|---|---|---|
| 455504 | 3/1949 | Canada | 423/449.1 |
| 0020889 | 4/1980 | European Pat. Off. | C09C 1/50 |
| 60-042439 | 3/1985 | Japan | C08K 3/04 |
| 61-47758 | 3/1986 | Japan | 423/449.1 |
| 61/47759 | 3/1986 | Japan | 423/449.1 |
| 61-283635 | 12/1986 | Japan | 423/449.1 |
| 1-229074 | 8/1989 | Japan | C08K 3/04 |
| 2-011664 | 1/1990 | Japan . | |
| 2-11664 | 1/1990 | Japan | C09C 1/50 |
| 2-308835 | 12/1990 | Japan . | |
| 3-190945 | 8/1991 | Japan | B29D 31/00 |
| 4-198273 | 7/1992 | Japan . | |
| 127991 | 12/1986 | U.S.S.R. | 423/449.1 |
| 1011905 | 12/1965 | United Kingdom | 423/449.1 |
| 1022988 | 3/1966 | United Kingdom | 423/449.1 |
| 1 269 372 | 4/1972 | United Kingdom | C09C 1/48 |
| 1269372 | 4/1972 | United Kingdom . | |
| 1304390 | 1/1973 | United Kingdom . | |
| PCT/US92/ 09110 | 5/1993 | WIPO | C09C 1/50 |
| PCT/US93/ 01972 | 9/1993 | WIPO | C09C 1/50 |
| WO93/21270 | 10/1993 | WIPO | C08L 23/16 |
| PCT/US93/ 08070 | 3/1994 | WIPO | C08K 3/04 |
| WO 94/05732 | 3/1994 | WIPO | C09C 1/50 |
| PCT/US94/ 01948 | 8/1995 | WIPO | C09C 1/50 |

OTHER PUBLICATIONS

Copy of an ASTM Standard from the American Society for Testing and Materials, ASTM Standard D 3849 entitled "Carbon Black—Primary Aggregate Dimension from Electron Microscope Image Analysis;" 1987 no month.

Copy of an ASTM Standard from the American Society for Testing and Materials, ASTM Standard D 1765, cited by the Examiner in Form PTO–892 from USSN No. 07/935,794; no date.

A copy of "Carbon Black Science and Technology," Second Edition, pp. 106 through 131; no date.

A copy of "Kirk–Othmer, Encyclopedia of Chemical Technology," Third Edition, vol. 4, Blood, Coagulants and Anticoagulants to Cardiovascular Agents, pp. 636 through 644; no date.

A copy of "The Oil Furnace Process Physical Properties Chemical Properties Applications," Part Two (Supplement), pp. 130 through 144, no date.

ASTM–D 1065–89 Publication no month 1989.

WIPO International Search Report, PCT/US 93/08129 Jun. 1994.

WIPO International Search Report, PCT/US 94/01948 Nov. 1994.

*Primary Examiner*—Michael Lewis
*Assistant Examiner*—Stuart L. Hendrickson
*Attorney, Agent, or Firm*—Martha A. Finnegan; James A. Cairns; Michelle B. Lando

[57] ABSTRACT

Novel carbon blacks that impart advantageous properties to rubber and plastic compositions and may be utilized in the place of lamp blacks, thermal carbon blacks and blends of carbon blacks. Also disclosed are novel rubber and plastic compositions incorporating the novel carbon blacks which exhibit the advantageous combinations of compound processing and physical performance properties.

6 Claims, 2 Drawing Sheets

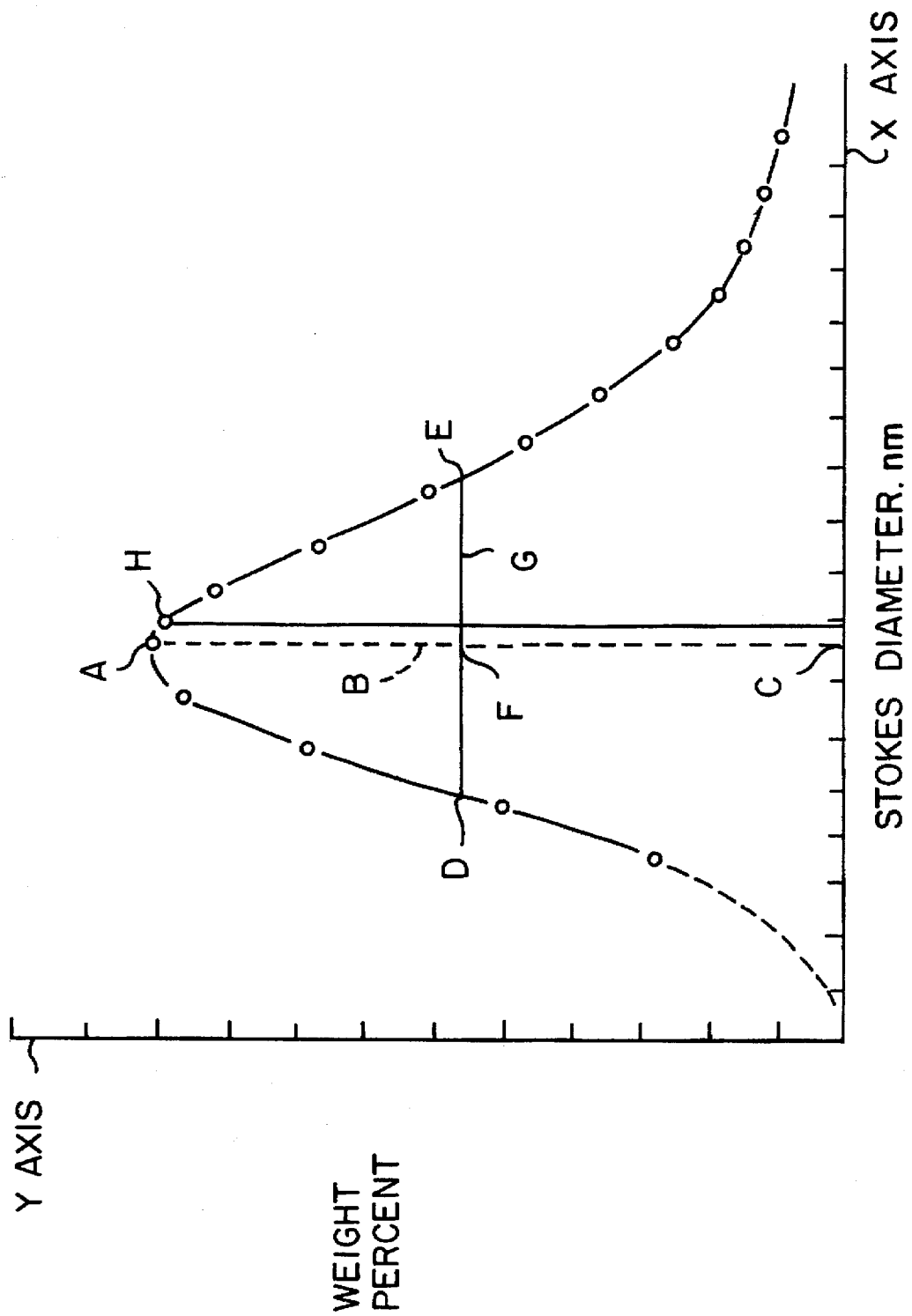

CARBON BLACKS

This application is a continuation-in-part of U.S. patent application Ser. No. 08/202,244, filed Feb. 25, 1994, now U.S. Pat. No. 5,456,750 which in turn is a continuation-in-part of U.S. patent application Ser. No. 08/081,881, filed Jun. 25, 1993, which in turn is a continuation-in-part of U.S. patent application Ser. No. 07/935,794, filed Aug. 27, 1992, both now abandoned.

FIELD OF THE INVENTION

The present invention relates to new carbon blacks which are suitable for various applications and particularly well suited for use in plastic and rubber compositions.

BACKGROUND

Carbon blacks may be utilized as pigments, fillers, reinforcing agents, and for a variety of other applications. They are widely utilized as fillers and reinforcing pigments in the compounding and preparation of rubber compositions and plastic compositions.

Carbon blacks are generally characterized on the basis of their properties including, but not limited to, their surface areas, surface chemistry, aggregate sizes, and particle sizes. The properties of carbon blacks are analytically determined by tests known to the art, including iodine adsorption number ($I_2$No.), dibutyl phthalate adsorption (DBP), Tint value (TINT), Dst, Dmode and M-Ratio that is defined as the median aggregate Stokes diameter divided by the mode aggregate Stokes diameter (M-Ratio=Dst/Dmode).

From the prior art several references are known. These include U.S. Pat. Nos. 4,366,139; 4,221,772; 3,799,788; 3,787,562; Soviet Union Patent No. 1279991; Canadian Patent No. 455504; Japanese Patent No. 61-047759; British Patent No. 1022988; and Japanese Patent No. 61-283635. None of the aforementioned references disclose the carbon black products of the present invention. Moreover, none of the aforementioned references describe the use for which the carbon blacks of the present invention are intended.

SUMMARY OF THE INVENTION

We have discovered new classes of carbon blacks advantageous for use in rubber and plastic compositions where compound processing and physical properties such as mixing energy, viscosity, cure rate, extrusion shrinkage, tensile, fatigue life, compression set, hardness, resistivity and surface appearance are important. These carbon blacks have been found to provide unique combinations of properties that make them especially well suited for use in extrusion, molded part, hose and belt applications.

The first class of carbon blacks has an Iodine adsorption number ($I_2$No.) of 10–19 mg/g (milligrams of $I_2$ per gram carbon black); a DBP (dibutyl phthalate value) of 70–95 cc/100 g (cubic centimeters of diburyl phthalate per 100 grams carbon black); and a volatiles content of less than 2%, by weight.

The second class of carbon blacks has an $I_2$No. of 14–18 mg/g; a DBP of 34–44 cc/100 g; and a volatiles content of less than 2%, by weight.

The third class of carbon blacks has an $I_2$No. of 8–17 mg/g; a DBP of 45–55 cc/100 g; and a volatiles content of less than 2%, by weight.

The fourth class of carbon blacks has an $I_2$No. of 28–43 mg/g; a DBP of 28–47 cc/100 g; and a volatiles content of less than 2%, by weight. Preferably this class of carbon blacks is characterized by an $I_2$No. of 30–42 mg/g.

The fifth class of carbon blacks has an $I_2$No. of 8–11 mg/g; a DBP of 28–38 cc/100 g; and a volatiles content of less than 2%, by weight.

The sixth class of carbon blacks has an $I_2$No. of 8–32 mg/g; a DBP of 28–53 cc/100 g; and an M-Ratio of the carbon black aggregate of 1.25–2.00. Preferably the sixth class of carbon blacks has a volatiles content of less than 2%, by weight.

The seventh class of carbon blacks has an $I_2$No. of 8–22 mg/g; a DBP of 54–70 cc/100 g; and an M-Ratio of the carbon black aggregate of 1.25–2.00. Preferably the seventh class of carbon blacks has a volatiles content of less than 2%, by weight.

The eighth class of carbon blacks has an $I_2$No. of 8–32 mg/g; a DBP of 71–150 cc/100 g; and an M-Ratio of the carbon black aggregate of 1.25–2.00. Preferably the eighth class of carbon blacks has a volatiles content of less than 2%, by weight.

We have also discovered new classes of rubber and plastic compositions containing the carbon blacks.

The carbon blacks of the present invention may be produced in a furnace carbon black reactor having a combustion zone, a transition zone, and a reaction zone. A carbon black yielding feedstock is injected into a hot combustion gas stream. The resultant mixture of hot combustion gases and feedstock passes into the reaction zone. Pyrolysis of the carbon black yielding feedstock is stopped by quenching the mixture after the carbon blacks of the present invention have been formed. Preferably pyrolysis is stopped by injecting a quenching fluid. The process for preparing the novel carbon blacks of the present invention will be described in greater detail hereinafter.

The rubbers and plastics for which the novel carbon blacks of this invention are effective include natural and synthetic rubbers and plastics. Generally, amounts of the carbon black product ranging from about 10 to about 300 parts by weight can be used for each 100 parts by weight of rubber or plastic.

Among the rubbers or plastics suitable for use with the present invention are natural rubber, synthetic rubber and their derivatives such as chlorinated rubber; copolymers of from about 10 to about 70 percent by weight of styrene and from about 90 to about 30 percent by weight of butadiene such as copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinyl-pyridine, 5-methyl-2-vinylpyridine, 5-ethyl-2-vinylpyridine, 2-methyl-5-vinylpyridine, alkyl-substituted acrylates, vinyl ketone, methyl isopropenyl ketone, methyl vinyl ether, alphamethylene carboxylic acids and the esters and amides thereof such as acrylic acid and dialkylacrylic acid amide; also suitable for use herein are copolymers of ethylene and other high alpha olefins such as propylene, butene-1 and penetene-1; particularly preferred are the ethylene-propylene copolymers wherein the ethylene content ranges from 20 to 90 percent by weight and also the ethylene-propylene polymers which additionally contain a third monomer such as dicyclopentadiene, 1,4-hexadiene and methylene norbornene. Additionally preferred polymeric compositions are olefins such as polypropylene and polyethylene.

An advantage of the carbon blacks of the present invention is that the carbon blacks are useful for incorporation into natural rubbers, synthetic rubbers, plastics or blends thereof for industrial applications, particularly where compound processing and part performance characteristics are important.

A further advantage of the carbon blacks of the present invention is that certain of the carbon blacks of the present invention will replace blends of carbon blacks in applications that currently require the use of blends of carbon blacks to achieve desired performance characteristics.

Other advantages of the present invention will become apparent from the following more detailed description of the invention.

BRIEF DESCRIPTION OF THE DRAWINGS

FIG. 2 is a sample histogram of the weight fraction of the aggregates of a carbon black sample versus the Stokes Diameter in a given sample.

DETAILED DESCRIPTION OF THE INVENTION

Figure 1:
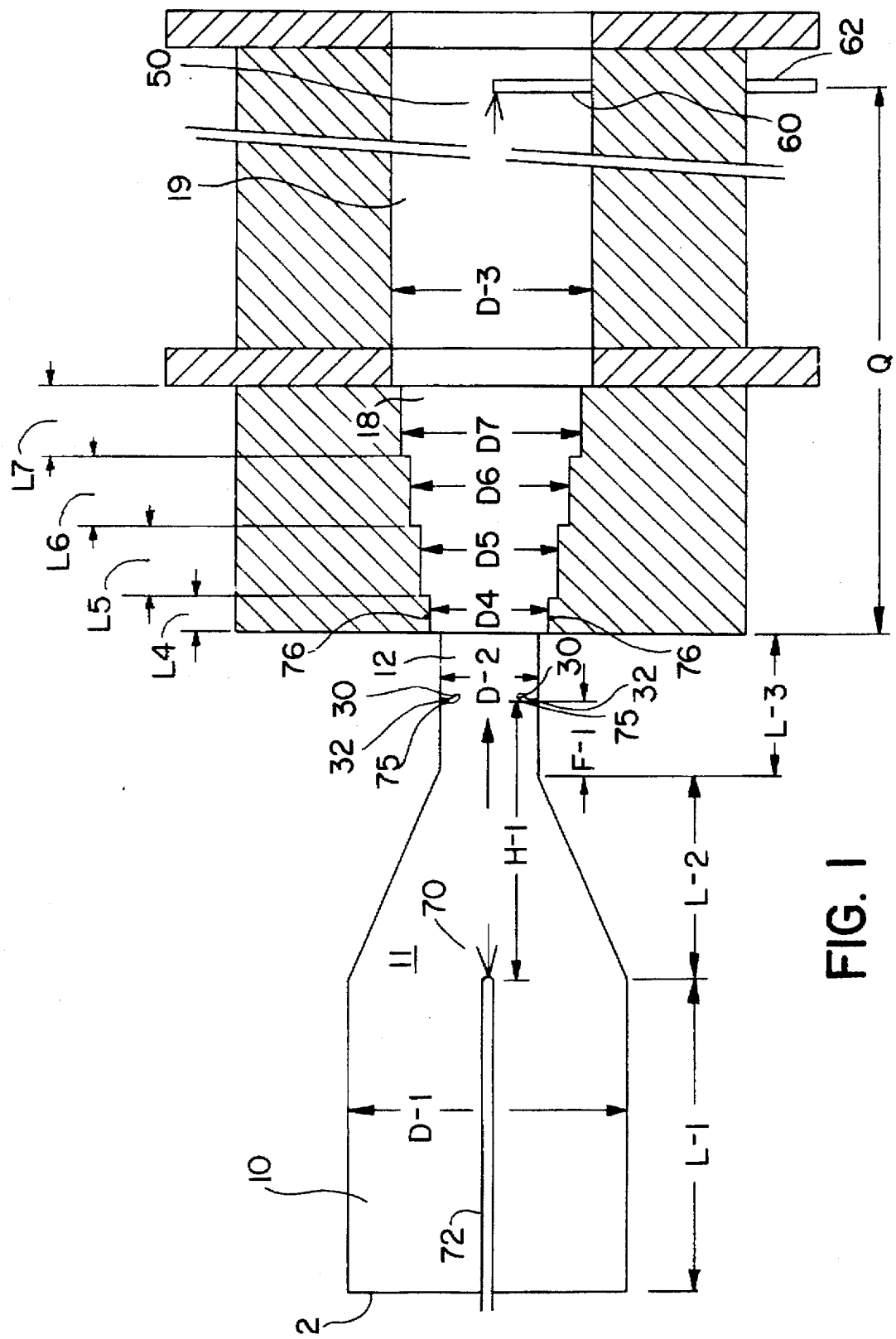
FIG. 1 is a cross-sectional view of a portion of one type of furnace carbon black reactor which may be utilized to produce the carbon blacks of the present invention.

The analytical properties of each of the classes of carbon blacks of the present invention are set forth in Table 1 below:

TABLE 1

| Class | $I_2$No. (mg/g) | DBP (cc/100 g) | Volatiles Content (%, by weight) | M-Ratio |
|---|---|---|---|---|
| First | 10–19 | 70–95 | <2 | N.A. |
| Second | 14–18 | 34–44 | <2 | N.A. |
| Third | 8–17 | 45–55 | <2 | N.A. |
| Fourth | 28–43 | 28–47 | <2 | N.A. |
| Fourth Preferred | 30–42 | 28–47 | <2 | N.A. |
| Fifth | 8–11 | 28–38 | <2 | N.A. |
| Sixth | 8–32 | 28–53 | N.A. | 1.25–2.00 |
| Seventh | 8–22 | 54–70 | N.A. | 1.25–2.00 |
| Eighth | 8–32 | 71–150 | N.A. | 1.25–2.00 |

N.A. = not applicable

The carbon blacks of the present invention may be produced in a modular, also referred to as "staged", furnace carbon black reactor. A section of a typical modular furnace carbon black reactor which may be utilized to produce the carbon black of the present invention is depicted in FIG. 1. Other details of a typical modular furnace carbon black reactor may be found, for example, in the description contained in U.S. Pat. No. 3,922,335, the disclosure of which is herein incorporated by reference. A carbon black reactor particularly well-suited for the production of the carbon blacks of the present invention is described in commonly assigned U.S. patent application Ser. No. 07/818, 943, filed Jan. 10, 1992, now issued as U.S. Pat. No. 5,190,739 on Mar. 2, 1993, the disclosure of which is hereby incorporated by reference. The carbon blacks of the Examples described herein were made by the process described in the '739 patent. The '739 patent describes a process for producing carbon blacks wherein auxiliary hydrocarbon is added to the reaction zone of a multistage reactor and the primary combustion and overall combustion of the reaction are adjusted so that the SSI of the process is less than zero. The SSI of the process may be determined by the following relationships:

$$SSI = \frac{SAS_{mf} - SAS_{ah}}{|SAS_{mf}|}$$

where $$SAS_{mf} = \frac{\Delta(DBP)_{mf}}{\Delta(\text{Iodine Number})_{mf}} \; ; \; SAS_{ah} = \frac{\Delta(DBP)_{ah}}{\Delta(\text{Iodine Number})_{ah}} \; ;$$

$|SAS_{mf}|$=Absolute value of $SAS_{mf}$;

$\Delta(DBP)_{mf}$=the change in DBPA of the carbon black due to a change in feedstock flow rate while all other process operating conditions are held constant;

$\Delta(\text{Iodine Number})_{mf}$=the change in iodine adsorption number of the carbon black due to a change in feedstock flow rate while all other process operating conditions are held constant;

$\Delta(DBP)_{ah}$=the change in DBPA of the carbon black due to a change in auxiliary hydrocarbon flow rate while all other process operating conditions are held constant; and $\Delta(\text{Iodine Number})_{ah}$=the change in iodine adsorption number of the carbon black due to a change in auxiliary hydrocarbon flow rate while all other process operating conditions are held constant.

The "auxiliary hydrocarbon" comprises hydrogen or any hydrocarbon having a molar hydrogen-to-carbon ratio greater than the molar hydrogen-to-carbon ratio of the feedstock.

Referring to FIG. 1, the carbon blacks of the present invention may be produced in a furnace carbon black reactor 2, having a combustion zone 10, which has a zone of converging diameter 11, transition zone 12, entry section 18, and reaction zone 19. The diameter of the combustion zone 10, up to the point where the zone of converging diameter 11 begins, is shown as D-1; the diameter of zone 12, as D-2; the diameters of the stepped entry section, 18, as D-4, D-5, D-6, and D-7; and the diameter of zone 19, as D-3. The length of the combustion zone 10, up to the point where the zone of converging diameter 11 begins, is shown as L-1; the length of the zone of converging diameter is shown as L-2; the length of the transition zone is shown as L-3; and the lengths of the steps in the reactor entry section, 18, as L-4, L-5, L-6 and L-7.

To produce carbon blacks, hot combustion gases are generated in combustion zone 10, by contacting a liquid or gaseous fuel with a suitable oxidant stream such as air, oxygen, mixtures of air and oxygen or the like. Among the fuels suitable for use in contacting the oxidant stream in combustion zone 10 to generate the hot combustion gases are any of the readily combustible gas, vapor, or liquid streams such as natural gas, hydrogen, carbon monoxide, methane, acetylene, alcohol, or kerosene. It is generally preferred, however, to utilize fuels having a high content of carbon-containing components and in particular, hydrocarbons. The ratio of air to natural gas utilized to produce the carbon blacks of the present invention may preferably be from about 10:1 to about 100:1. To facilitate the generation of hot combustion gases, the oxidant stream may be preheated.

The hot combustion gas stream flows downstream from zones 10 and 11 into zones 12, 18, and 19. The direction of the flow of hot combustion gases is shown in the figure by the arrow. Carbon black-yielding feedstock 30 is introduced at point 32 (located in zone 12), and/or at point 70 (located in zone 11). Suitable for use herein as carbon black-yielding hydrocarbon feedstocks, which are readily volatilizable under the conditions of the reaction, are unsaturated hydrocarbons such as acetylene; olefins such as ethylene, propylene, butylene; aromatics such as benzene, toluene and xylene; certain saturated hydrocarbons; and other hydrocarbons such as kerosenes, naphthalenes, terpenes, ethylene tars, aromatic cycle stocks and the like.

The distance from the end of the zone of converging diameter 11 to point 32 is shown as F-1. Generally, carbon black-yielding feedstock 30 is injected in the form of a plurality of streams which penetrate into the interior regions of the hot combustion gas stream to insure a high rate of mixing and shearing of the hot combustion gases and the carbon black-yielding feedstock so as to rapidly and completely decompose and convert the feedstock to carbon black.

Auxiliary hydrocarbon is introduced at point 70 through probe 72 or through auxiliary hydrocarbon passages 75 in the walls which form the boundaries of zone 12 of the carbon black forming process or through auxiliary hydrocarbon passages 76 in the walls which form the boundaries of zones 18 and/or 19 of the carbon black forming process. The auxiliary hydrocarbon may be introduced at any location between the point immediately after the initial combustion reaction of the first-stage fuel and the point immediately before the end of formation of carbon black provided that unreacted auxiliary hydrocarbon eventually enters the reaction zone.

The distance from point 32 to point 70 is shown as H-1.

In the Examples described herein, the auxiliary hydrocarbon was introduced through either three or four orifices in the same axial plane as the carbon black yielding feedstock streams. The orifices are arranged in an alternating pattern, one feedstock, the next auxiliary hydrocarbon, spaced evenly around the outer periphery of section 12. As will be noted, however, this is merely exemplary and is not intended to be limiting of the methods usable for introducing auxiliary hydrocarbon.

The mixture of carbon black-yielding feedstock and hot combustion gases flows downstream through zone 12 into zone 18 and then into zone 19. Quench 60, located at point 62, injecting quenching fluid 50, which may be water, is utilized to stop chemical reaction when carbon blacks are formed. Point 62 may be determined in any manner known to the art for selecting the position of a quench to stop pyrolysis. One method for determining the position of the quench to stop pyrolysis is by determining the point at which an acceptable toluene extract level for the carbon black is reached. Toluene extract level may be measured by using ASTM Test D1618-83 "Carbon Black Extractables—Toluene Discoloration". Q is the distance from the beginning of zone 18 to quench point 62, and will vary according to the position of Quench 60.

After the mixture of hot combustion gases and carbon black-yielding feedstock is quenched, the cooled gases pass downstream into any conventional cooling and separating means whereby the carbon blacks are recovered. The separation of the carbon black from the gas stream is readily accomplished by conventional means such as a precipitator, cyclone separator or bag filter. This separation may be followed by pelletizing using, for example, a wet pelletizer.

The following testing procedures are used in evaluating the analytical and physical properties of the carbon blacks of the present invention.

Iodine adsorption number of the carbon blacks ($I_2$ No.) was determined according to ASTM Test Procedure D1510. Tinting strength (Tint) of the carbon blacks was determined according to ASTM Test Procedure D3265-85a. The DBP (dibutyl phthalate value) of the carbon blacks was determined according to the procedure set forth in ASTM D3493-86. The cetyl-trimethyl ammonium bromide absorption value (CTAB) of the carbon blacks was determined according to ASTM Test Procedure D3765-85.

Volatiles content of the carbon blacks (in %, by weight) was determined by the following Cabot Test Procedure.

Volatile Content Of Carbon Blacks

This method covers the determination of the volatile content of carbon black at 950° C.

Equipment

1. Muffle Furnace, capable of temperature regulation of 950°±25° C.

2. Vycor or glazed porcelain, high-form crucible, 50 cm³ capacity, With proper size cover. A smaller capacity crucible, 30 or 40 cm³, call be used for pelleted blacks.

3. Analytical Balance having a sensitivity of 0.1 mg.

4. Desiccator filled with indicating desiccant. (A metal desiccator will hasten the cooling process.)

5. Oven, convection or vacuum type, capable of temperature regulation of 125±1° C.

6. Tongs.

7. Insulating gloves for protection from high temperatures.

8. Tamping Rod.

9. Interval Timer.

Procedure

1. Place an adequate amount of carbon black to complete test into an aluminum dish with cover.

2. Dry an adequate sample of the carbon black one hour or longer at 125° C.±1° C. until constant weight is obtained.

3. Cool in desiccator to room temperature.

4. Ignite the crucible with cover in muffle furnace at 950° C.±25° C. for ½ hour. (Never touch the crucible or cover with bare hands. Always use Asbestos gloves and tongs when transferring the crucible and cover to and from the muffle furnace. Always keep the crucible covered.) Place crucible and cover in desiccator. Cool to room temperature and weigh crucible and cover to the nearest 0.1 mg.

5. Fill crucible to within approximately five millimeters of the top. For fluffy samples, tamp the black with a tamping rod to minimize trapped air, and continue filling crucible to within approximately five millimeters of the top. Replace cover and weigh cover, crucible and carbon. Record weight to the nearest 0.1 mg.

6. Place the covered crucible in muffle furnace at 950° C.±25° C. for 7 minutes. Place crucible and cover in desiccator and allow to cool to room temperature. Record weight to the nearest 0.1 mg.

Calculations

Calculate the percent of volatiles as follows:

$$\%A = [(C-D)/(C-B)] \times 100$$

Where:
A=Percent Volatiles
B=Weight Crucible and cover, in grams.
C=Weight of Crucible, cover and sample, in grams.
D=Weight of Crucible, cover and sample after fired, in grams.

Dmode, and Dst of the carbon blacks were determined from a histogram of the weight fraction of carbon black versus the Stokes diameter of the carbon black aggregates, as shown in FIG. 2. The data used to generate the histogram are determined by the use of a disk centrifuge such as the one manufactured by Joyce Loebl Co. Ltd. of Tyne and Wear, United Kingdom. The following procedure is a modification of the procedure described in the instruction manual of the Joyce Loebl disk centrifuge file reference DCF 4.008 published on Feb. 1, 1985, the teachings of which are hereby incorporated by reference, and was used in determining the data.

The procedure is as follows. 10 mg (milligrams) of a carbon black sample are weighed in a weighing vessel, then added to 50 cc of a solution of 10% absolute ethanol and 90% distilled water which is made 0.05% NONIDET P-40 surfactant (NONIDET P-40 is a registered trademark for a surfactant manufactured and sold by Shell Chemical Co.). The resulting suspension is dispersed by means of ultrasonic energy for 15 minutes using Sonifier Model No. W 385, manufactured and sold by Heat Systems Ultrasonics Inc., Farmingdale, N.Y.

Prior to the disk centrifuge run the following data are entered into the computer which records the data from the disk centrifuge:
1. The specific gravity of carbon black, taken as 1.86 g/cc;
2. The volume of the solution of the carbon black dispersed in a solution of water and ethanol, which in this instance is 0.5 cc.;
3. The volume of spin fluid, which in this instance is 10 cc of water;
4. The viscosity of the spin fluid, which in this instance is taken as 0.933 centipoise at 23 degrees C.;
5. The density of the spin fluid, which in this instance is 0.9975 g/cc at 23 degrees C.;
6. The disk speed, which in this instance is 8000 rpm;
7. The data sampling interval, which in this instance is 1 second.

The disk centrifuge is operated at 8000 rpm while the stroboscope is operating. 10 cc of distilled water are injected into the spinning disk as the spin fluid. The turbidity level is set to 0; and 1 cc of the solution of 10% absolute ethanol and 90% distilled water is injected as a buffer liquid. The cut and boost buttons of the disk centrifuge are then operated to produce a smooth concentration gradient between the spin fluid and the buffer liquid and the gradient is monitored visually. When the gradient becomes smooth such that there is no distinguishable boundary between the two fluids, 0.5 cc of the dispersed carbon black in aqueous ethanol solution is injected into the spinning disk and data collection is started immediately. If streaming occurs the run is aborted. The disk is spun for 20 minutes following the injection of the dispersed carbon black in aqueous ethanol solution. Following the 20 minutes of spinning, the disk is stopped, the temperature of the spin fluid is measured, and the average of the temperature of the spin fluid measured at the beginning of the run and the temperature of the spin fluid measured at the end of the run is entered into the computer which records the data from the disk centrifuge. The data is analyzed according to the standard Stokes equation and is presented using the following definitions:

Carbon black aggregate—a discrete, rigid colloidal entity that is the smallest dispersible unit; it is composed of extensively coalesced particles;

Stokes diameter—the diameter of a sphere which sediments in a viscous medium in a centrifugal or gravitational field according to the Stokes equation. A non-spherical object, such as a carbon black aggregate, may also be represented in terms of the Stokes diameter if it is considered as behaving as a smooth, rigid sphere of the same density, and rate of sedimentation as the object. The customary units are expressed in nanometer diameters.

Mode (Dmode for reporting purposes)—The Stokes diameter of the carbon black aggregate at the point of the peak (Point A of FIG. 2 herein) of the distribution curve for Stokes diameter.

Median Stokes diameter—(Dst for reporting purposes) the point on the distribution curve of Stokes diameter of carbon black aggregate where 50% by weight of the sample is either larger or smaller. It therefore represents the median value of the determination.

The modulus, tensile and elongation of the EPDM compositions were measured by the procedure set forth in ASTM D412-87.

The Shore A Hardness of the EPDM compositions was determined according to the procedure set forth in ASTM D-2240-86.

Rebound data for the EPDM compositions was determined according to the procedure set forth in ASTM D1054, utilizing a ZWICK Rebound Resilience Tester, Model 5109, manufactured by Zwick of America, Inc., Post Office Box 997, East Windsor, Conn. 06088. Instructions for determining the rebound values accompany the instrument.

The Compression set of the EPDM compositions was determined according to the procedure set forth in ASTM D395, wherein the composition was tested at 150° F. for 70 hours.

The extrusion shrinkage of the EPDM compositions was determined by the procedure set forth in ASTM D-3674. The extrusion shrinkage was measured on the BRABENDER extruder at 100° C. and 50 rpm using a 5 mm diameter die.

The viscosity of the EPDM compositions was determined by the procedure set forth in ASTM D-1646 using a Monsanto MPT capillary rheometer maintained at 100° C. using a die having a ratio of L/D'=16 and D=0.0787 mm (millimeter). The shear rate ranged from 10 to 150 1/seconds.

Mixing energy is the total amount of energy put into the compositions which is determined by integrating the mixing torque curve over the course of the mixing cycle, described hereinafter.

Cure characteristics of the EPDM compositions were measured using a Monsanto MDR curemeter maintained at 160° C. The time to reach 90% cure reaction (t'90), the total torque change during cure reaction ($\Delta L$) and cure rate index (CRI; (CRI=1/(t'90−ts1)×100) where ts1=the time when the torque level is 1 unit above minimum torque (ts1 is also referred to as scorch time)) are reported for the example EPDM compositions. The tests were conducted according to the instructions furnished with the Monsanto MDR curemeter.

Composition resistivity was measured on plaque samples 2 inches wide by 6 inches long by 0.085 inch thick. The plaques were painted on both ends with a half inch width of silver paint. The sample was conditioned to produce a stable reading by cycling from room temperature to 100° C. and back to room temperature, followed by aging at 90° C. for 24 hours. The stabilized resistivity was measured at the end of the aging cycle, and once again after the sample was allowed to cool back to room temperature.

The effectiveness and advantages of the present invention will be further illustrated by the following examples.

EXAMPLES 1–9

Examples of the novel carbon blacks of the present invention were prepared in a reactor generally described herein, and as depicted in FIG. 1, utilizing the reactor conditions and geometry set forth in Table 3. The fuel utilized in the combustion reaction was natural gas. The auxiliary hydrocarbon used was also natural gas. The liquid feedstock utilized had the properties indicated in Table 2 below:

TABLE 2

Feedstock Properties

| | EXAMPLES | |
|---|---|---|
| | 1–8 | 9 |
| Hydrogen/Carbon Ratio | 0.93 | 1.00 |
| Hydrogen (wt. %) | 7.19 | 7.71 |
| Carbon (wt. %) | 92.1 | 91.94 |
| Sulfur (wt. %) | 0.30 | 0.23 |
| Nitrogen (wt. %) | 0.41 | 0.22 |
| A.P.I. Gravity 15.6/15.6° C. (60/60° F.) [ASTM D-287] | −1.6 | +6.4 |
| Specific Gravity 15.5/15.6° C. (60/60° F.) [ASTM D-287] | 1.092 | 1.026 |

TABLE 2-continued

Feedstock Properties

| | EXAMPLES | |
|---|---|---|
| | 1–8 | 9 |
| Viscosity, SUS (54.4° C.) m$^2$/s [ASTM D-88] | $2.6 \times 10^{-5}$ | $1.3 \times 10^{-5}$ |
| Viscosity, SUS (98.9° C.) m$^2$/s [ASTM D-88] | $5.2 \times 10^{-6}$ | $4.8 \times 10^{-6}$ |

The reactor conditions and geometry were as set forth in Table 3 below.

TABLE 3

Reactor Geometry and Operating Conditions.

| Example No. | 1 | 2 | 3 | 4 | 5 | 6 | 7 | 8 | 9 |
|---|---|---|---|---|---|---|---|---|---|
| D-1 (m) | 0.18 | 0.18 | 0.18 | 0.18 | 0.18 | 0.18 | 0.18 | 0.18 | 0.18 |
| D-2 (m) | 0.11 | 0.11 | 0.11 | 0.11 | 0.13 | 0.11 | 0.13 | 0.13 | 0.10 |
| D-3 (m) | 0.69 | 0.69 | 0.69 | 0.69 | 0.91 | 0.69 | 0.69 | 0.69 | 0.91 |
| D-4 (m) | 0.25 | 0.25 | 0.25 | 0.25 | 0.26 | 0.25 | 0.25 | 0.36 | 0.23 |
| D-5 (m) | 0.69 | 0.69 | 0.69 | 0.69 | 0.33 | 0.69 | 0.69 | 0.69 | 0.91 |
| D-6 (m) | 0.69 | 0.69 | 0.69 | 0.69 | 0.91 | 0.69 | 0.69 | 0.69 | 0.91 |
| D-7 (m) | 0.69 | 0.69 | 0.69 | 0.69 | 0.91 | 0.69 | 0.69 | 0.69 | 0.91 |
| L-1 (m) | 0.61 | 0.61 | 0.61 | 0.61 | 0.61 | 0.61 | 0.61 | 0.61 | 0.61 |
| L-2 (m) | 0.30 | 0.30 | 0.30 | 0.30 | 0.30 | 0.30 | 0.30 | 0.30 | 0.30 |
| L-3 (m) | 0.23 | 0.23 | 0.23 | 0.23 | 0.23 | 0.23 | 0.23 | 0.23 | 0.23 |
| L-4 (m) | 0.30 | 0.30 | 0.30 | 0.30 | 0.30 | 0.30 | 0.30 | 0.14 | 0.30 |
| L-5 (m) | 0.10 | 0.10 | 0.10 | 0.10 | 0.23 | 0.10 | 0.10 | 0.10 | 0.11 |
| L-6 (m) | 0.00 | 0.00 | 0.00 | 0.00 | 0.00 | 0.00 | 0.00 | 0.00 | 0.00 |
| L-7 (m) | 0.00 | 0.00 | 0.00 | 0.00 | 0.00 | 0.00 | 0.00 | 0.00 | 0.00 |
| F-1 (m) | 0.11 | 0.11 | 0.11 | 0.11 | 0.11 | 0.11 | 0.11 | 0.11 | 0.11 |
| Q (m) | 7.93 | 7.93 | 7.93 | 7.93 | 7.93 | 7.93 | 19.8 | 7.93 | 12.2 |
| Comb. Air (SCMS) | 0.373 | 0.373 | 0.634 | 0.634 | 0.634 | 0.373 | 0.448 | 0.634 | 0.472 |
| Comb. Air Preheat (K) | 755 | 755 | 755 | 755 | 755 | 755 | 755 | 755 | 755 |
| Burner Nat. Gas ($10^2 \times$ SCMS) | 0.9 | 0.9 | 2.0 | 2.0 | 1.8 | 0.9 | 1.4 | 2.0 | 1.0 |
| Feedstock Inj. Orifice Diam. (cm) | 0.198 | 0.218 | 0.198 | 0.198 | 0.185 | 0.218 | 0.198 | 0.206 | 0.226 |
| No. Feedstock Inj. Orifices | 3 | 3 | 3 | 3 | 4 | 3 | 4 | 4 | 3 |
| Feedstock Rate ($10^4 \times$ m$^3$/s) | 1.3 | 1.2 | 1.9 | 2.3 | 1.3 | 1.2 | 1.6 | 2.1 | 1.2 |
| Feedstock Temp. (K) | 483 | 463 | 451 | 438 | 467 | 439 | 467 | 415 | 362 |
| K$^+$ Conc. (g/m$^3$) | 0.0 | 93.1 | 81.0 | 0.0 | 388.0 | 11.4 | 0.8 | 20.3 | 443 |
| Aux. HC Inj. Orifice Diam. (cm) | 0.635 | 0.635 | 0.635 | 0.635 | 0.635 | 0.635 | 0.635 | 0.635 | 0.508 |
| No. Aux. HC Inj. Orifices (*) | 3 | 3 | 3 | 3 | 4 | 3 | 4 | 4 | 3 |
| Aux. HC Rate ($10^2 \times$ SCMS) | 2.4 | 2.3 | 2.1 | 3.9 | 3.1 | 2.1 | 1.7 | 0.0 | 3.5 |
| Primary Comb. (%) | 400 | 450 | 400 | 400 | 300 | 450 | 400 | 400 | 500 |
| Overall Comb. (%) | 21.7 | 23.3 | 25.4 | 21.5 | 22.9 | 23.5 | 21.4 | 25.8 | 25.6 |

Inj. = injection; Comb. = combustion; HC = hydrocarbon; Diam = diameter; (*) - The feedstock and auxiliary hydrocarbon orifices were arranged in the same axial plane in an alternating sequence around the periphery of the reactor.

The carbon blacks produced in runs 1–9 were then analyzed according to the procedures described herein. The analytical properties of the carbon blacks were as set forth in Table 4.

TABLE 4

Carbon Black Analytical Properties

| Example | 1 | 2 | 3 | 4 | 5 | 6 | 7 | 8 | 9 |
|---|---|---|---|---|---|---|---|---|---|
| $I_2$No. (mg/g) | 22.1 | 16.5 | 28.0 | 16.3 | 40.7 | 15.8 | 28.7 | 57.9 | 16.5 |
| DBP (cc/100 g) | 132.5 | 39.1 | 35.8 | 84.6 | 43.1 | 46.9 | 119.5 | 95.8 | 30.0 |
| CTAB($m^2$/g) | 25.3 | 17.3 | 29.8 | 18.7 | 45.1 | 18.6 | 27.8 | 53.1 | 18.3 |
| Tint (%) | 33.0 | 33.4 | 54.7 | 32.5 | 85.6 | 29.7 | 42.3 | 74.2 | 31.1 |
| Dmode (nm) | 289 | 275 | 212 | 276 | 176 | 270 | 252 | 140 | 242 |
| Dst (nm) | 459 | 443 | 300 | 492 | 240 | 426 | 348 | 180 | 310 |
| M-Ratio | 1.59 | 1.61 | 1.42 | 1.78 | 1.36 | 1.58 | 1.38 | 1.29 | 1.28 |
| Volatile content (%, by wt.) | 0.4 | 0.3 | 0.3 | 0.3 | 0.4 | 0.5 | 0.4 | 0.6 | 0.2 |

These carbon blacks and four control carbon blacks were utilized in the following examples. The four control carbon blacks utilized, A–D, had the analytical properties shown below in Table 5:

TABLE 5

Control Carbon Black Analytical Properties

| Control | A | B | C | D |
|---|---|---|---|---|
| Type | GPF | FEF | Thermal | SRF |
| $I_2$No. (mg/g) | 35.4 | 40.0 | 8.2 | 29.9 |
| DBP (cc/100 g) | 91.0 | 111.7 | 37.5 | 68.5 |
| CTAB ($m^2$/g) | 35.9 | 44.3 | 9.9 | 30.1 |
| Tint (%) | 57.8 | 64.6 | 21.7 | 51.6 |
| Dmode (nm) | 206 | 144 | 416 | 256 |
| Dst (nm) | 220 | 186 | 492 | 288 |
| M-Ratio | 1.07 | 1.29 | 1.18 | 1.12 |

GPF = general purpose furnace
FEF = fast extruding furnace
Thermal = carbon black produced by a thermal process
SRF = semi reinforcing furnace

EXAMPLE 10

The carbon blacks of the present invention produced in example runs 1–9 were incorporated into EPDM (ethylene-propylene diene polymethylene) compositions and compared to EPDM compositions incorporating the four control carbon blacks. The EPDM compositions were prepared utilizing each of the carbon black samples in an mount of 200 parts by weight in the EPDM Composition Formulation shown below in Table 6.

TABLE 6

EPDM COMPOSITION FORMULATION

| INGREDIENT | Part by weight |
|---|---|
| EPDM | 100 |
| Carbon Black | 200 |
| Sunpar 2280 Oil | 100 |
| Zinc Oxide | 5 |
| Stearic Acid | 1 |
| TMTDS | 2.7 |
| Butyl Zimate | 2.7 |
| Methyl Zimate | 2.7 |

TABLE 6-continued

EPDM COMPOSITION FORMULATION

| INGREDIENT | Part by weight |
|---|---|
| Sulfur | 0.5 |
| Sulfasan R | 1.7 |

EPDM — EXXON VISTALON ® 5600, manufactured and sold by EXXON Corporation, Houston, Texas;
Sunpar 2280 — A trademarked oil manufactured and sold by Sun Oil Company;
TMTDS — tetramethylthiuram disulfide;
Butyl Zimate — a trademarked zinc dibutyldithiocarbamate manufactured and sold by R. T. Vanderbilt Co.;
Methyl Zimate — a trademarked zinc dimethyldithiocarbamate manufactured and sold by R. T. Vanderbilt Co.;
Sulfasan R — a trademarked 4,4'-dithiodimorpholine, manufactured and sold by Monsanto, Co., St. Louis, Missouri.

The EPDM compositions were produced as follows.

A Banbury BR mixer was started and maintained at a temperature of 45° C. and a rotor speed of 77 RPM. EPDM was added to the mixer and mixed for approximately 30 seconds. The Sunpar 2280 oil, zinc oxide and stearic acid, were added to the EPDM and mixed for approximately 2 additional minutes. The carbon black was added to the mixture and the temperature of the mixing chamber was cooled and maintained at a temperature of below approximately 135° C. The carbon black containing EPDM mixture was mixed for approximately 4½ minutes and then the curing agents, TMTDS, Butyl Zimate, Methyl Zimate, Sulfur and Sulfasan R, were added to the mixture. The resulting mixture was mixed for approximately 1½ minutes while the temperature was maintained at below approximately 135° C. The batch composition was then discharged from the mixer and analyzed by the techniques described herein.

The EPDM compositions produced using the carbon blacks of the present invention produced in runs 1–9 described herein had the performance characteristics set forth below in Table 7.

The EPDM compositions incorporating the control carbon blacks A–D were also evaluated according to the procedures described herein. The results are set forth in Tables 8–13 below, where comparisons between EPDM compositions containing carbon blacks of the present invention and EPDM compositions containing the most appropriate control carbon black are made.

TABLE 7

Comparison of EPDM Composition Performance

| Example No. | 1 | 2 | 3 | 4 | 5 | 6 | 7 | 8 | 9 |
|---|---|---|---|---|---|---|---|---|---|
| Carbon Black Analytical Properties: | | | | | | | | | |
| Iodine Number (mg/g) | 22.1 | 16.5 | 28.0 | 16.3 | 40.7 | 15.8 | 28.7 | 57.9 | 16.5 |
| DBP (cc/100 g) | 132.5 | 39.1 | 35.8 | 84.6 | 43.1 | 46.9 | 119.5 | 95.8 | 30.0 |
| CTAB ($m^2/g$) | 25.3 | 17.3 | 29.8 | 18.7 | 18.8 | 27.8 | 53.1 | 18.3 | 18.3 |
| Tint (%) | 33.0 | 33.4 | 54.7 | 32.5 | 85.6 | 29.7 | 42.3 | 74.2 | 31.1 |
| Mode Stokes Diameter (nm) | 289 | 275 | 212 | 276 | 176 | 270 | 252 | 140 | 242 |
| Median Stokes Diam. (nm) | 459 | 443 | 300 | 492 | 240 | 426 | 348 | 180 | 310 |
| M-Ratio (Median/Mode Stokes) | 1.59 | 1.61 | 1.42 | 1.78 | 1.36 | 1.58 | 1.38 | 1.29 | 1.28 |
| Volatile Content (%, by weight) | 0.4 | 0.3 | 0.3 | 0.3 | 0.4 | 0.5 | 0.4 | 0.6 | 0.2 |
| EPDM Composition Performance at 200 phr: | | | | | | | | | |
| Viscosity (Pa · S)@ 10 $sec^{-1}$ | 16300 | 10000 | 10900 | 18000 | 14100 | 11300 | 22900 | 23700 | 9300 |
| Viscosity (Pa · S)@ 150 $sec^{-1}$ | 2600 | 1520 | 1590 | 1920 | 1720 | 1600 | 2790 | 3130 | 1310 |
| Mixing Energy ($MJ/m^3$) | 1300 | 797 | 876 | 1110 | 943 | 839 | 1348 | 1571 | 687 |
| Extrusion Rate (g/min) | 37.0 | 38.6 | 42.3 | 40.0 | 34.8 | 35.9 | 47.1 | 50.6 | 41.6 |
| Extrusion Shrinkage (%) | 12.5 | 40.3 | 43.0 | 21.7 | 41.1 | 32.5 | 13.8 | 12.5 | 45.5 |
| t'90 (min) | 8.23 | 11.6 | 11.9 | 9.7 | 9.6 | 11.0 | 10.5 | 9.9 | 13.7 |
| ΔL (g · m) | 238 | 190 | 206 | 272 | 271 | 193 | 308 | 218 | 164 |
| Hardness (Shore A) | 79 | 58 | 65 | 69 | 65 | 61 | 76 | 79 | 50 |
| E100 ($10^4 \times N/m^2$) | 662 | 223 | 175 | 392 | 192 | 298 | 540 | 628 | 112 |
| Tensile ($10^4 \times N/m^2$) | 1069 | 1027 | 974 | 925 | 1009 | 871 | 929 | 1268 | 740 |
| Elong. at Break. (%) | 243 | 564 | 623 | 389 | 595 | 439 | 232 | 237 | 724 |
| Rebound (%) | 39 | 52.0 | 43.7 | 47.4 | 34.2 | 52.4 | 40.0 | 30.5 | 51.8 |
| Compression Set (%) (70 hrs, 150° C.) | 55 | 34 | 50 | 52 | 65 | 31 | 54 | 58 | 51 |
| Resistivity (Ω · cm) @25° C. | 72 | — | — | 106 | 208 | — | 24 | — | — |
| Resistivity (Ω · cm) @90° C. | 127 | — | — | 153 | 178 | — | 43 | — | — |

— = not evaluated

TABLE 8

Comparison of EPDM Composition Performance.

| Example No. | 1 | 7 | Control B |
|---|---|---|---|
| Carbon Black Analytical Properties: | | | |
| Iodine Number (mg/g) | 22.1 | 28.7 | 40.0 |
| DBP (cc/100 g) | 132.5 | 119.5 | 111.7 |
| CTAB ($m^2/g$) | 25.3 | 27.8 | 44.3 |
| Tint (%) | 33.0 | 42.3 | 64.6 |
| Mode Stokes Diameter (nm) | 289 | 252 | 144 |
| Median Stokes Diameter (nm) | 459 | 348 | 186 |
| M-Ratio (Median/Mode Stokes) | 1.59 | 1.38 | 1.29 |
| Volatile Content (%, by weight) | 0.4 | 0.4 | — |
| EPDM Composition Performance at 200 phr: | | | |
| Viscosity (Pa · S) @ 10 $sec^{-1}$ | 16300 | 22900 | 30700 |
| Viscosity (Pa · S) @ 150 $sec^{-1}$ | 2600 | 2790 | 3450 |
| Mixing Energy ($MJ/m^3$) | 1300 | 1348 | 1561 |
| Extrusion Rate (g/min) | 37.0 | 47.1 | 44.7 |
| Extrusion Shrinkage (%) | 12.5 | 13.8 | 18.2 |
| t'90 (min) | 8.23 | 10.5 | 7.45 |
| ΔL (g · m) | 238 | 308 | 293 |
| Hardness (Shore A) | 79 | 76 | 82 |
| E100 ($10^4 \times N/m^2$) | 662 | 540 | 650 |
| Tensile ($10^4 \times N/m^2$) | 1069 | 929 | 1103 |
| Elong. at Break. (%) | 243 | 232 | 184 |
| Rebound (%) | 39 | 40.0 | 31.0 |
| Compression Set (%) (70 hrs, 150° C.) | 55 | 54 | 57 |
| Resistivity (Ω · cm) @ 25° C. | 72 | 24 | 43 |
| Resistivity (Ω · cm) @ 90° C. | 127 | 43 | 69 |

— = not evaluated

The results set forth in Table 8 indicate that at a carbon black level of 200 phr the EPDM compositions incorporating the carbon blacks of the present invention have lower viscosity and lower mixing energy. Therefore the EPDM compositions incorporating the carbon blacks of the present invention exhibit better processing characteristics than the EPDM compositions incorporating the control carbon blacks.

TABLE 9

Comparison of EPDM Composition Performance

| Example No. | 1 | Control B |
|---|---|---|
| Carbon Black Analytical Properties: | | |
| Iodine Number (mg/g) | 22.1 | 40.0 |
| DBP (cc/100 g) | 132.5 | 111.7 |
| CTAB ($m^2/g$) | 25.3 | 44.3 |
| Tint (%) | 33.0 | 64.6 |
| Mode Stokes Dia. (nm) | 289 | 144 |
| Median Stokes Dia. (nm) | 459 | 186 |
| M-Ratio (Median/Mode Stokes) | 1.59 | 1.29 |
| Volatile Content (%, by weight) | 0.4 | — |
| EPDM Composition Performance at 150 phr: | | |
| Viscosity (Pa · S) @ 10 $sec^1$ | 12500 | 22200 |
| Viscosity (Pa · S) @ 150 $sec^1$ | 1900 | 1940 |
| Mixing Energy ($MJ/m^3$) | 1010 | 1222 |
| Extrusion Rate (g/min) | 39 | 37.4 |
| Extrusion Shrinkage (%) | 17.2 | 19.8 |
| t'90 (min) | 9.25 | 8.33 |
| ΔL (g · m) | 200 | 249 |
| Hardness (Shore A) | 69 | 71 |
| E100 ($10^4 \times N/m^2$) | 407 | 376 |

TABLE 9-continued

Comparison of EPDM Composition Performance

| Example No. | 1 | Control B |
|---|---|---|
| Tensile ($10^4 \times N/m^2$) | 1145 | 1179 |
| Elong. at Break (%) | 436 | 370 |
| Rebound (%) | 46.1 | 35.8 |
| Compression Set (%)(70 hrs, 150° C.) | 57 | 57 |
| Resistivity ($\Omega \cdot cm$) @ 25° C. | 400 | 88 |
| Resistivity ($\Omega \cdot cm$) @ 90° C. | 640 | 118 |

— = not evaluated

The results set forth in Table 9 show the advantage of utilizing a carbon black of the present invention in an EPDM composition for an application where resistivity is a critical requirement. As shown in the table, at 150 phr loading, which is typical for a cooling hose application, the EPDM composition incorporating the carbon black of the present invention exhibits a higher resistivity than the EPDM composition incorporating the control carbon black.

Additionally, the EPDM composition incorporating the carbon black of the present invention has lower viscosity and lower mixing energy than the EPDM composition incorporating the control carbon black. This indicates that EPDM compositions incorporating the carbon black of the present invention will have improved processability in comparison with EPDM compositions incorporating the control carbon black.

TABLE 10

Comparison of EPDM Composition Performance

| Example No. | 6 | 2 | 9 | Control C |
|---|---|---|---|---|
| Carbon Black Analytical Properties: | | | | |
| Iodine Number (mg/g) | 15.8 | 16.5 | 16.5 | 8.2 |
| DBP (cc/100 g) | 46.9 | 39.1 | 30.0 | 37.5 |
| CTAB (m²/g) | 18.6 | 17.3 | 18.3 | 9.9 |
| Tint (%) | 29.7 | 33.4 | 31.1 | 21.7 |
| Modes Stokes Dia. (nm) | 270 | 275 | 242 | 416 |
| Median Stokes Dia. (nm) | 426 | 443 | 310 | 492 |
| M-Ratio (Median/Mode Stokes) | 1.58 | 1.61 | 1.28 | 1.18 |
| Volatile Content (%, by weight) | 0.5 | 0.3 | 0.2 | — |
| EPDM Composition Performance at 200 phr: | | | | |
| Viscosity (Pa·) @ 10 sec¹ | 11300 | 10000 | 9300 | 10400 |
| Viscosity (Pa·) @ 150 sec¹ | 1600 | 1520 | 1310 | 1490 |
| Mixing Energy (MJ/m³) | 839 | 797 | 687 | 799 |
| Extrusion Rate (g/min) | 35.9 | 38.6 | 41.6 | 32.0 |
| Extrusion Shrinkage (%) | 32.5 | 40.3 | 45.5 | 43.5 |
| t'90 (min) | 11.0 | 11.6 | 13.7 | 13.2 |
| ΔL (g · m) | 193 | 190 | 164 | 220 |
| Hardness (Shore A) | 61 | 58 | 50 | 53 |
| E100 ($10^4 \times N/m^2$) | 298 | 223 | 112 | 109 |
| Tensile ($10^4 \times N/m^2$) | 871 | 1027 | 740 | 933 |
| Elong. at Break (%) | 439 | 564 | 724 | 794 |
| Rebound (%) | 52.4 | 52.0 | 51.8 | 55.0 |
| Compression Set (%) (70 hrs, 150° C.) | 31 | 34 | 51 | 54 |

— not evaluated

The results set forth in Table 10 indicate that the carbon blacks of the present invention provide improved reinforcement and processing properties for EPDM compositions when compared to thermal carbon blacks. Thus the carbon blacks of the present invention advantageously provide furnace carbon black replacements for thermal carbon blacks or carbon black blends containing thermal carbon blacks.

TABLE 11

Comparison of EPDM Composition Performance

| Example No. | 3 | 4 | 5 | Control C | Control D |
|---|---|---|---|---|---|
| Carbon Black Analytical Properties: | | | | | |
| Iodine Number (mg/g) | 28.0 | 16.3 | 40.7 | 8.2 | 29.9 |
| DBP (cc/100 g) | 35.8 | 84.6 | 43.1 | 37.5 | 68.5 |
| CTAB (m²g) | 29.8 | 18.7 | 45.1 | 9.9 | 30.1 |
| Tint (%) | 54.7 | 32.5 | 85.6 | 21.7 | 51.6 |
| Mode Stokes Dia. (nm) | 212 | 276 | 176 | 416 | 256 |
| Median Stokes Dia. (nm) | 300 | 492 | 240 | 492 | 288 |
| M-Ratio (Median/Mode Stokes) | 1.42 | 1.78 | 1.36 | 1.18 | 1.12 |
| Volatile Content (%, by weight) | 0.3 | 0.3 | 0.4 | — | — |
| EPDM Composition Performance at 200 phr: | | | | | |
| Viscosity (Pa · S) @ 10 sec¹ | 10900 | 18000 | 14100 | 10400 | 16600 |
| Viscosity (Pa·) @ 150 sec¹ | 1590 | 1920 | 1720 | 1490 | 1880 |
| Mixing Energy (MJ/m³) | 876 | 1110 | 943 | 799 | 1091 |
| Extrusion Rate (g/min) | 42.3 | 40.0 | 34.8 | 32.0 | 36.8 |
| Extrusion Shrinkage (%) | 43.0 | 21.7 | 41.1 | 43.5 | 23.8 |
| t'90 (min) | 11.9 | 9.7 | 9.6 | 13.2 | 11.2 |
| ΔL (g · m) | 206 | 272 | 271 | 220 | 270 |
| Hardness (Shore A) | 65 | 69 | 65 | 53 | 69 |
| E100 ($10^4 \times N/m^2$) | 175 | 392 | 192 | 109 | 338 |
| Tensile ($10^4 \times N/m^2$) | 974 | 925 | 1009 | 933 | 989 |
| Elong. at Break (%) | 623 | 389 | 595 | 794 | 421 |
| Rebound (%) | 43.7 | 47.4 | 34.2 | 55.0 | 40.6 |
| Compression Set (%) (70 hrs, 150° C.) | 50 | 52 | 65 | 54 | 57 |

— not evaluated

The results set forth in Table 11 indicate that the carbon blacks of the present invention can replace the use of blends of thermal and SRF type carbon blacks to provide a satisfactory degree of performance characteristics. EPDM compositions incorporating the carbon black of Example 5 also yield profiles having textured matte finishes when extruded or shaped.

TABLE 12

Comparison of EPDM Composition Performance

| Example No. | 8 | Control A | Control B |
|---|---|---|---|
| Carbon Black Analytical Properties: | | | |
| Iodine Number (mg/g) | 57.9 | 35.4 | 40.0 |
| DBP (cc/100 g) | 95.8 | 91.0 | 111.7 |
| CTAB (m²/g) | 53.1 | 35.9 | 44.3 |
| Tint (%) | 74.2 | 57.8 | 64.6 |
| Mode Stokes Dia. (nm) | 140 | 206 | 144 |
| Median Stokes Dia. (nm) | 180 | 220 | 186 |
| M-Ratio (Median/Mode Stokes) | 1.29 | 1.07 | 1.29 |
| Volatiles (%, by weight) | 0.6 | — | — |
| EPDM Composition Performance at 200 phr: | | | |
| Viscosity (Pa · S) @ 10 sec¹ | 23700 | 24000 | 30700 |
| Viscosity (Pa · S) @ 150 sec¹ | 3130 | 2850 | 3450 |
| Mixing Energy (MJ/m³) | 1581 | 1252 | 1561 |
| Extrusion Rate (g/min) | 50.6 | 41.1 | 44.7 |
| Extrusion Shrinkage (%) | 12.5 | 15.9 | 18.2 |
| t'90 (min) | 9.9 | 7.41 | 7.45 |
| ΔL (g · m) | 218 | 299 | 293 |
| Hardness (Shore A) | 79 | 75 | 82 |
| E100 ($10^4 \times N/m^2$) | 628 | 493 | 650 |
| Tensile ($10^4 \times N/m^2$) | 1268 | 1030 | 1103 |

TABLE 12-continued

Comparison of EPDM Composition Performance

| Example No. | 8 | Control A | Control B |
|---|---|---|---|
| Elong. at Break (%) | 237 | 288 | 184 |
| Rebound (%) | 30.5 | 34.5 | 31.0 |
| Compression Set (%) (70 hrs, 150° C.) | 58 | 50 | 57 |

— not evaluated

The results set forth in Table 12 indicate that the EPDM composition incorporating the carbon black of the present invention has a higher extrusion rate than the EPDM compositions incorporating the control carbon black. Thus, EPDM compositions incorporating the carbon blacks of the present invention may be extruded at higher throughputs than EPDM compositions incorporating the control carbon blacks.

The EPDM composition incorporating the carbon black of the present invention also has a lower extrusion shrinkage and therefore will have better dimensional control during the extrusion operation than the EPDM compositions incorporating the control carbon blacks.

These results also indicate that the EPDM composition incorporating the carbon black of the present invention has good overall physical properties. Additionally, the carbon blacks of the present invention have a unique combination of surface area and structure that results in the carbon blacks being useful in preparing EPDM compositions that are to be UHF cured.

It should be clearly understood that the forms of the present invention herein described are illustrative only and are not intended to limit the scope of the invention.

We claim:

1. A carbon black having an $I_2$No. of 8–17 mg/g; a DBP of 45–55 cc/100 g and a volatiles content of less than 2%, by weight.

2. A composition of matter comprising: a material selected from the group consisting of rubbers and plastics; and a carbon black of claim 1.

3. A carbon black having an $I_2$No. of 8–22 mg/g; a DBP of 54–70 cc/100 g and an M-Ratio of the carbon black aggregate of 1.25–2.00.

4. A composition of matter comprising: a material selected from the group consisting of rubbers and plastics; and a carbon black of claim 3.

5. A carbon black having an $I_2$No. of 8–32 mg/g; a DBP of 71–150 cc/100 g and an M-Ratio of the carbon black aggregate of 1.25–2.00.

6. A composition of matter comprising: a material selected from the group consisting of rubbers and plastics; and a carbon black of claim 5.

* * * * *